(12) United States Patent
Furukawa et al.

(10) Patent No.: US 7,716,391 B2
(45) Date of Patent: May 11, 2010

(54) DATA TRANSFER APPARATUS, DATA TRANSFER METHOD, AND PROGRAM

(75) Inventors: Kazuya Furukawa, Osaka (JP); Nobuo Higaki, Hyogo (JP); Hideyo Tsuruta, Osaka (JP); Kazushi Kurata, Osaka (JP); Shigeki Fujii, Osaka (JP); Kousuke Yoshioka, Osaka (JP); Hiroyuki Morishita, Osaka (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 11/382,379

(22) Filed: May 9, 2006

(65) Prior Publication Data
US 2006/0259662 A1 Nov. 16, 2006

(30) Foreign Application Priority Data
May 11, 2005 (JP) ............................. 2005-139071

(51) Int. Cl.
*G06F 3/00* (2006.01)
(52) U.S. Cl. ........................................ 710/27; 709/240
(58) Field of Classification Search .................... 710/6, 710/27, 42
See application file for complete search history.

(56) References Cited

U.S. PATENT DOCUMENTS

| | | | | |
|---|---|---|---|---|
| 4,853,877 A | * | 8/1989 | Parkhurst et al. ............. | 358/1.4 |
| 4,949,250 A | | 8/1990 | Bhandarkar et al. | |
| 5,826,095 A | * | 10/1998 | Jordan ......................... | 712/11 |
| 6,099,585 A | * | 8/2000 | Godfrey ...................... | 717/154 |
| 6,104,414 A | * | 8/2000 | Odryna et al. ............... | 345/536 |
| 6,570,571 B1 | * | 5/2003 | Morozumi ................... | 345/505 |
| 7,089,431 B2 | | 8/2006 | Matsuo et al. | |
| 7,215,680 B2 | * | 5/2007 | Mullendore et al. ......... | 370/412 |
| 2002/0010822 A1 | * | 1/2002 | Kim ........................... | 710/110 |
| 2003/0159077 A1 | | 8/2003 | Matsuo et al. | |

FOREIGN PATENT DOCUMENTS

| | | |
|---|---|---|
| CN | 1012538 | 5/1991 |
| CN | 1365059 | 8/2002 |
| CN | 1425153 | 6/2003 |
| CN | 1435744 | 8/2003 |
| JP | 05-204833 | 8/1993 |
| WO | 01/55844 | 8/2001 |

OTHER PUBLICATIONS

English language Abstract and partial translation of CN 1365059.

* cited by examiner

*Primary Examiner*—Henry W. H. Tsai
*Assistant Examiner*—Elias Mamo
(74) *Attorney, Agent, or Firm*—Greenblum & Bernstein, P.L.C

(57) ABSTRACT

A data transfer apparatus according to the present invention has; a DMAC and another DMAC which transfer data by direct memory access among a plurality of buses; a command queue which holds, as a queue, commands for instructing the data transfer; a bus information obtainment unit which obtains the commands from the command queue; a grouping unit which groups the held commands, based on a source and a destination designated in each of the obtained commands; a schedule unit which decides an order of issuing the commands sequentially from a group having more command, as a priority; and a selector which selects a command to be issued according to the decided order.

19 Claims, 12 Drawing Sheets

FIG. 2A

| Memory Name | Memory Type Name | Description |
|---|---|---|
| Memory A 102<br>Memory B 103 | Shared Memory | This memory can be used by other masters besides DMAC 101a and DMAC 101b, so that this memory is not always available to DMAC 101a or DMAC 101b. |
| Memory C 104<br>Memory D 105 | Local Memory | This memory is used by DMAC 101a or DMAC 101b only. |

FIG. 2B

| Transfer capable by DMAC 101a | | Destination | | |
|---|---|---|---|---|
| | | Memory A 102 | Memory C 104 | Memory D 105 |
| Source | Memory A 102 | × | ○ | ○ |
| | Memory C 104 | ○ | × | × |
| | Memory D 105 | ○ | × | × |

FIG. 2C

| Transfer capable by DMAC 101a | | Destination | | |
|---|---|---|---|---|
| | | Memory B 103 | Memory C 104 | Memory D 105 |
| Source | Memory B 103 | × | ○ | ○ |
| | Memory C 104 | ○ | × | × |
| | Memory D 105 | ○ | × | × |

DATA TRANSFER APPARATUS, DATA TRANSFER METHOD, AND PROGRAM

BACKGROUND OF THE INVENTION (1) Field of the Invention

The present invention relates to a data transfer apparatus, a data transfer method, and a program, for transferring data using direct memory access.

(2) Description of the Related Art

There are various technologies using the direct memory access DMA (hereinafter, referred to as DMA). One of the examples is disclosed in Japanese Patent Application Laid-Open No. 5-204833 as a DMA transfer controller which controls data transfer, using the DMA, between each of multiple peripheral devices and a memory. This DMA transfer controller has multiple channels, each of which is allocated to each peripheral device. The peripheral devices are connected to the memory via a single bus. When there are conflicts in DMA requests issued from the multiple peripheral devices, the DMA transfer controller arbitrates for these DMA requests. More specifically, the multiple channels -are grouped, and the DMA transfer is executed in an order firstly from a DMA request belonging to a group having a higher priority. The DMA transfer for a DMA request belonging to a group having a lower priority is executed, when the DMA request belonging to the group having a higher priority does not exist. For the DMA requests included in each group, the DMA transfers are executed circularly.

Thereby, the DMA transfers are executed for the groups, in the order of priority. Moreover, for each group, only a specific channel is not used exclusively, but the multiple channels are used equally during the DMA transfers,

SUMMARY OF THE INVENTION

However, in the above-described conventional technology, the priority of the channels is controlled for the DMA transfers which are performed via a single bus, but recent media processors and the like are required to efficiently execute the DMA transfers via multiple independent buses.

Moreover, in the above-described conventional technology, the data transfer is controlled between each of the peripheral devices and the memory, but the recent media processors and the like are required to efficiently execute the DMA transfer between memories via multiple independent buses.

In a view of the above problems, an object of the present invention is to provide a data transfer apparatus, a data transfer method, and a program, for efficiently executing DMA data transfer between memories via multiple independent buses.

In order to solve above problems, a data transfer apparatus transfers data and used in a system having a first bus, a second bus, and a third bus, each of which is independent from one another, a first memory connected with the first bus, a second memory connected with the second bus, a third memory connected with the third bus, and a fourth memory connected with the third bus. The data transfer apparatus includes: a first transfer unit which transfers data by direct memory access between the first memory, and one of the third memory and the fourth memory; a second transfer unit which transfers data by direct memory access between the second memory, and one of the third memory and the fourth memory; a holding unit which holds, as a queue, commands for instructing the data transfer; an obtainment unit which obtains the commands held in the holding unit; a grouping unit which groups the held commands, based on a source or a destination indicated in each of the commands obtained by the obtainment unit; a scheduling unit which prioritizes the groups and to decide an order of issuing the commands sequentially from a group having a higher priority; and an issuing unit which issues the command to one of the first transfer unit and the second transfer unit, according to the decided order Here, the scheduling unit may give a higher priority to a group to which more commands belong.

With the above structure, when the first transfer unit and the second transfer unit independently transfer different DMA data between memories, which are connected to the three independent buses, it is possible to improve total transfer efficiency for the entire three buses. More specifically, there is a conflict when the first transfer unit and the second transfer unit attempt to execute different DMA data transfers, in parallel, to the third memory or the fourth memory, but by prioritized, by the schedule unit, a group having more commands, it is possible to shorten a total DMA transfer time for all commands and also to improve use efficiency of the buses, when there is the conflict in the DMA data transfers.

Here, the grouping unit may group the commands by transfer-source memories.

With the above structure, when a destination of a transfer path (from a source to a destination) is fixed, it is possible to improve grouping efficiency by the grouping unit.

Here, the grouping unit may group (a) commands which designate the first memory as a transfer source into one group, and (b) commands which designate the second memory as a transfer source into another group.

With the above structure, when, for example, each destination of the first memory and the second memory is fixed to the third memory or the fourth memory, it is possible to improve the grouping efficiency by the grouping unit.

Here, the grouping unit may group the commands by transfer-destination memories.

With the above structure, when a source of the transfer path is fixed, it is possible to improve the grouping efficiency by the grouping unit.

Here, the grouping unit may group (a) commands which designate the first memory as a transfer destination into one group, and (b) commands which designate the second memory as a transfer destination into another group.

With the above structure, when, for example, each source of the first memory and the second memory is fixed to as the third memory or the fourth memory, it is possible to improve the grouping efficiency by the grouping unit.

Here, the grouping unit may group (a) commands which designate the first memory as a transfer source or a transfer destination into one group, and (b) commands which designate the second memory as a transfer source or a transfer destination into another group.

With the above structure, when the first memory and the second memory can be used as the source or the destination for a plurality of commands, it is possible to improve the grouping efficiency by the grouping unit.

Here, each of the commands may include a pointer and various parameters, and the obtainment unit may obtain the parameters according to the pointer, sequentially from a top command.

Here, the commands may have a fixed length, and the obtainment unit may determine an address of a subsequent command, by sequentially adding each fixed length.

With the above structure, it is possible to sequentially obtain information of all commands held in the holding unit, by using simple pointer operations.

Here, the command may include a link to a subsequent command, and the obtainment unit may determine an address of the subsequent command according to the link.

With the above structure, it is possible to sequentially obtain information of all commands held in the holding unit, using pointer by referring to the links, even if the command has a variable length.

Here, the first memory may receive a memory access command from a master on the first bus, the second memory may receive a memory access command from a master on the second bus, and the third memory and the fourth memory may receive a memory access command only from the first transfer unit and the second transfer unit.

Here, the first memory may have a priority higher than the second memory, and the grouping unit may group the commands based on the priority.

With the above structure, when each of the first memory and the second memory is shared among other masters as well as the transfer unit, it is possible to efficiently execute even total DMA data transfers via the entire buses from the first to the third buses.

Here, the data transfer apparatus according to the present invention may further include a saving unit which temporarily saves a command which is currently executed by one of the first transfer unit and the second transfer unit.

With the above structure, when, for example, an execution latency (time required to transfer data) is long, it is possible to save an executing command temporarily, as needed.

Here, the scheduling unit may determine whether or not the executing command is to be saved, by comparing the command which is currently executed by one of the first transfer unit and the second transfer unit, with the commands held in the holding unit.

Here, the scheduling unit may determine whether or not the executing command is to be save, depending on a transfer size of remaining data of the command which is currently executed by one of the first transfer unit and second transfer unit, and a transfer size of a top command held in the holding unit.

Here, the command may include a time at which the data transfer is to be completed, and the scheduling unit may determine whether or not the executing command is to be save, depending on a time at which data transfer of the command, which is currently executed by one of the first transfer unit and second transfer unit, is to be completed, and a remaining time period.

Here, the data transfer apparatus according to the present invention may further include a dividing unit which divides one of the commands held in the holding unit into a plurality of commands.

Here, the data transfer apparatus according to present invention may be included in a device which processes a frame representing a picture for each rectangular region in the frame, and the dividing unit may divide a command regarding the rectangular region into a command for transferring data inside the frame, and a command for transferring data outside the frame.

Here, the command whose data is outside the frame may instruct to a destination memory to write information indicating a frame boundary.

With the above structure, it is possible to efficiently execute the DMA data transfer of only data included in the frame. In addition, since data outside the frame is regarded as invalid data and not transferred, it is possible to improve data transfer efficiency.

Here, the dividing unit may divide the rectangular region in the transfer-source memory designated by the command, into a plurality of smaller regions, in order to divide the command into commands each of which corresponds to each of the smaller regions.

With the above structure, when, for example, an access size of a small area is set to a data width of the destination memory, it is possible to improve the data transfer efficiency.

Here, the data transfer apparatus according to the present invention may further include a clock stop unit which stops supplying a clock signal to one of the first transfer unit and the second transfer unit, when there is no command to be executed in one of the first transfer unit and the second transfer unit.

Here, the holding unit holds the commands, and the clock stop unit may stop supplying a clock signal, when the top command is not able to be issued.

With the above structure, it is possible to save electric power consumption of the data transfer apparatus, and especially when the data transfer apparatus is embedded in a portable telephone, a PDA, or the like, it is possible to extend a driving time of a battery.

Furthermore, the data transfer method and the program according to the present invention have the same effects as described above, so that the detail is not described again here.

As described above, the data transfer apparatus according to the present invention can improve total transfer efficiency of the three buses, when the first transfer unit and the second transfer unit transfer different DMA data between memories, which are connected to the three independent buses. More specifically, there is a conflict when the first transfer unit and the second transfer unit attempt to execute different DMA data transfers, in parallel, to the third memory or the fourth memory, but by prioritized, by the schedule unit, a group having more commands, it is possible to shorten a total DMA transfer time for all commands and also to improve use efficiency of the buses, when there is the conflict in the DMA data transfers.

Further, when a destination of the transfer path (from a source to a destination) is fixed, for example when each destination of the first memory and the second memory is fixed to the third memory or the fourth memory, it is possible to improve grouping efficiency by a grouping unit.

Still further, when a source of the transfer path is fixed, for example when each source of the first memory and the second memory is fixed to the third memory or the fourth memory, it is possible to improve the grouping efficiency by the grouping unit.

Still further, when the first memory and the second memory can be used as sources or destinations, depending on a situation, it is possible to improve the grouping efficiency by the grouping unit.

Still further, it is possible to obtain information from all commands, by using simple pointer operations or using pointer operations referring to links.

Still further, when, for example, an execution latency (time required to transfer data) is long, it is possible to save an executing command temporarily, as needed.

Still further, by dividing a command, it is possible to improve the data transfer efficiency.

Still further, it is possible to save the electric power consumption.

FURTHER INFORMATION ABOUT TECHNICAL BACKGROUND TO THIS APPLICATION

The disclosure of Japanese Patent Application No. 2005-139071 filed on May 11, 2005 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the Drawings:

FIG. 2A is a table explaining memories A to D;

FIG. 2B is a table explaining data transfers executed by a DMAC 101a;

FIG. 2C is a table explaining data transfers executed by the DMAC 101b;

DESCRIPTION OF THE PREFERRED EMBODIMENT(S)

First Embodiment

Figure 1:
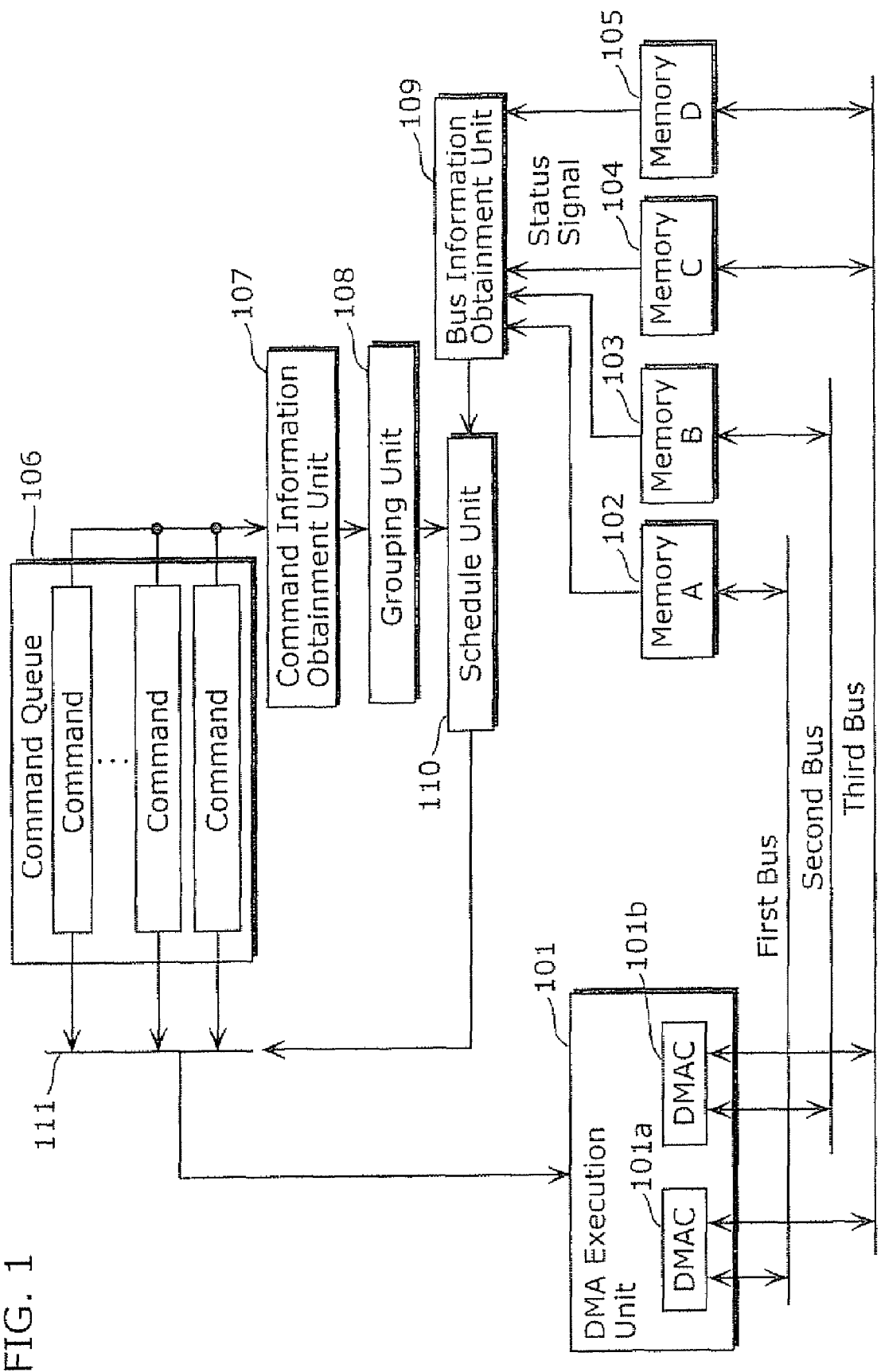
FIG. 1 is a block diagram showing a structure of a DMA data transfer apparatus according to the first embodiment of the present invention.

FIG. 1 is a block diagram showing a structure of a direct memory access (DMA) data transfer apparatus (hereinafter, referred to as a data transfer apparatus) according to the first embodiment of the present invention. The data transfer apparatus has a DMA execution unit 101, a memory A 102, a memory B 103, a memory C 104, a memory D 105, a command queue 106, a command information obtainment unit 107, a grouping unit 108, a bus information obtainment unit 109, a schedule unit 110, and a selector 111.

The DMA execution unit 101 includes a DMA controller (hereinafter, referred to as a DMAC) 101a and a DMAC 101b, in order to execute DMA data transfer among the memory A 102, the memory B 103, the memory C 104, and the memory D 105. The first bus connected to the memory A 102, the second bus connected to the memory B 103, and the third bus connected to the memory C 104 and the memory D 105 are independent from one another.

FIG. 2A is a table explaining the memory A 102, the memory B 103, the memory C 104, and the memory D 105. As shown in the table, the memory A 102 and the memory B 103 are memories each of which is used by various masters. More specifically, the memory A 102 receives memory access commands from masters on the first bus, while the memory B 103 receives memory access commands from masters on the second bus. Therefore, the memory A 102 is sometimes used by another master that is not the DMAC 101a, so that the DMAC 101a is not always able to use the memory A 102 when the DMAC 101a attempts to output a memory access command. Similarly, the memory B 103 is sometimes used by another master that is not the DMAC 101b, so that, the DMAC 101b is not always able to use the memory B 103 when the DMAC 101b attempts to output a memory access command.

FIG. 2B is a table explaining data transfers executed by the DMAC 101a. As shown in the table, the DMAC 101a transfers data using the DMA between the memory A 102, and the memory C 104 or the memory D 105. It is assumed that the data transfer can be performed from the memory A 102 to the memory C 104 or the memory D 105, and vice versa.

FIG. 2C is a table explaining data transfers executed by the DMAC 101b. As shown in the table, the DMAC 101b transfers data using the DMA between the memory B 1037 and the memory C 104 or the memory D 105. It is assumed that the data transfer can be performed from the memory B 103 to the memory C 104 or the memory D 105, and vice versa.

The command queue 106 shown in FIG. 1 holds, as a queue, commands which instructs data transfers using the DMA. These commands are stored into the command queue 106 by masters on the respective buses. Each of the commands includes various parameters and a pointer. The parameters are indication of a transfer path (a start address of a source and a start address of a destination), a transfer size, a time by which the transfer should complete, and the like. The pointer indicates a location for storing the parameters, because the command queue has a structure not of a physical first-in first-out (FIFO) memory but of a logical queue. Note that the commands have the same fixed length, or have respective variable length.

The command information obtainment unit 107 sequentially obtains information of all commands held in the command queue 106. If the commands (information of the commands) have the same fixed length, in order to sequentially obtain information of each command, the command information obtainment unit 107 calculates, after obtaining information of one command, an starting address of a command to be obtained next, by adding a pointer of the obtained command, with a fixed value. The above processing is repeated to obtain information of all commands. On the other hand, if the commands have respective variable length, since each of the commands includes link information, the command information obtainment unit 107 calculates, after obtaining information of one command, a starting address of a command to be obtained next, by adding a pointer of the obtained command, with a value of a size indicated by link information of the obtained command. The above processing is also repeated to obtain information of all commands.

Figure 3:
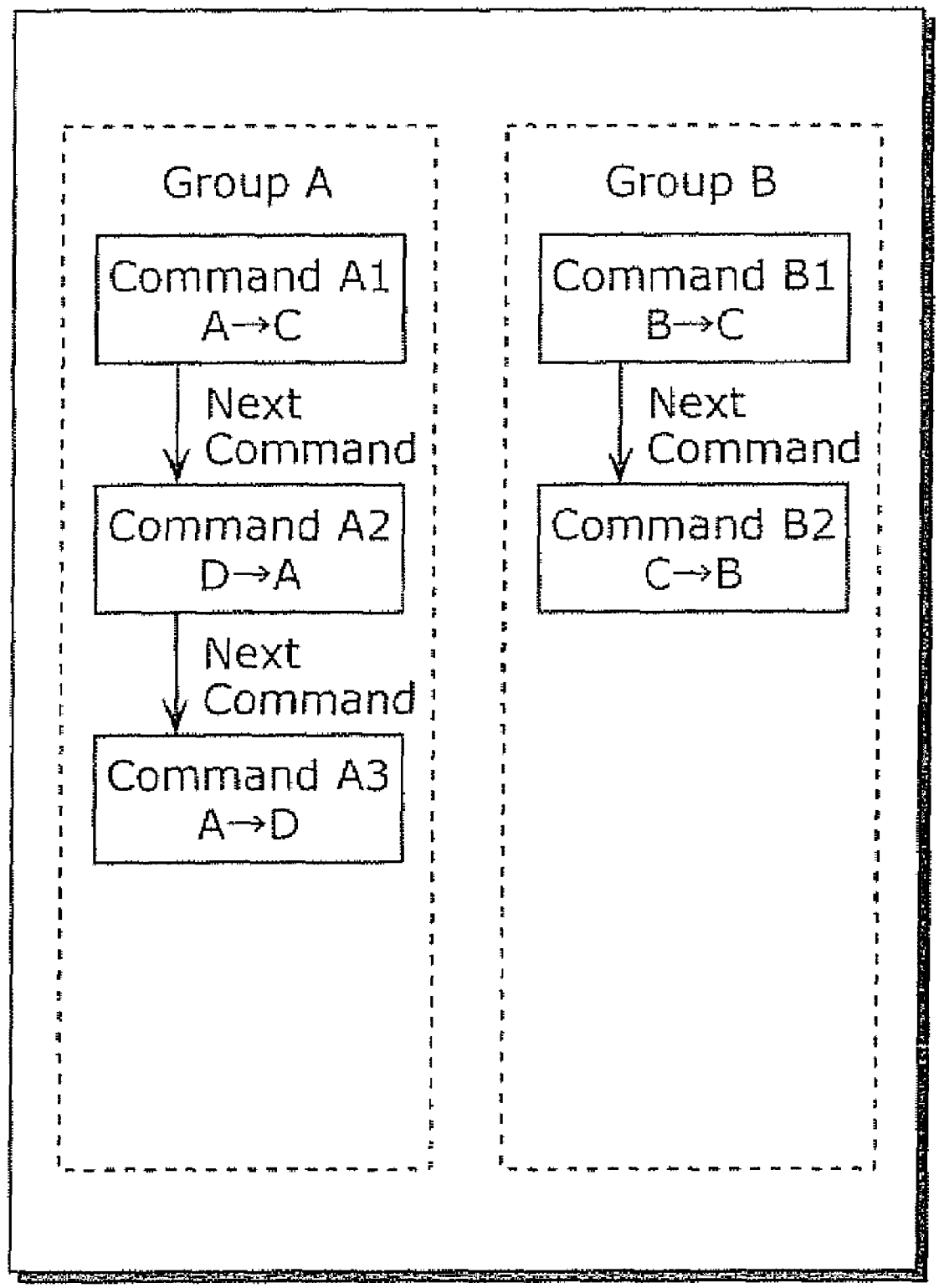
FIG. 3 is an explanatory diagram showing an example of grouping by a grouping unit.

The grouping unit 108 groups the commands held in the command queue 106, based on the information of a source or a destination which is indicated in each command and obtained by the command information obtainment unit 107. More specifically, the grouping unit 108 makes a group of commands whose sources or destinations are designated as the memory A 102, and a group of commands whose sources or destinations are designated as the memory B 103. FIG. 3 is an explanatory diagram showing one example of grouping by the grouping unit 108. In FIG. 3, a group A is the group of commands whose sources or destinations are designated as the memory A 102, while a group B is the group of commands whose source or destination are designated as the memory B 103. For example, a command A1 is a command which instructs data transfer from the memory A 102 to the memory C 104 (A→C). The other commands also instruct respective data transfers from sources to destinations.

The bus information obtainment unit 109 obtains bus information that indicates whether or not there is an access to each memory of the memory A 102, the memory B 103, the memory C 104, and the memory D 105.

The schedule unit 110 sets priorities among the groups, and determines an order of commands to be issued sequentially from a group with a higher priority. Here, the schedule unit 110 sets a higher priority to a group having more commands. In addition, the schedule unit 110 determines, based on the bus information, whether or not a transfer path of a top command in each group is free, and if the transfer path is free, then the schedule unit 110 issues the top command. However, if the transfer path is free but there is a conflict of multiple transfer paths among the groups, the issuing of the commands is executed according to the above-described priorities. Moreover, the commands in each group are issued in an arrangement order in the command queue 106.

Under the control of the schedule unit 110, the selector 111 selects a command to the DMAC 101a or the DMAC 101b, in the order which is determined by the schedule unit 110.

Figure 4A:
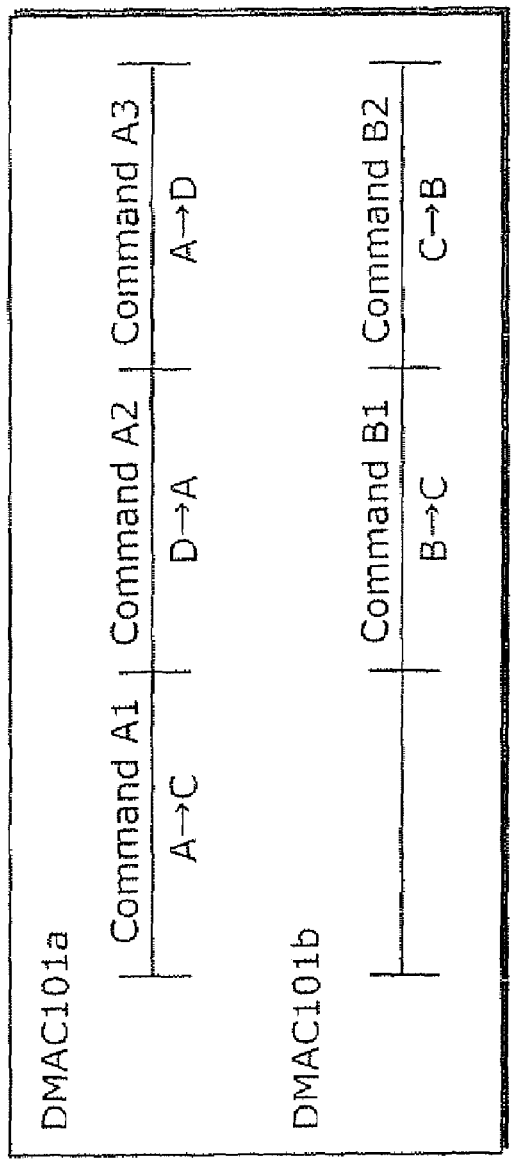
FIG. 4A is an explanatory diagram showing an example of command issuing by a schedule unit.

FIG. 4A is an explanatory diagram showing one example of command issuing by the schedule unit 110. In FIG. 4A, commands are assumed to be grouped as shown in FIG. 3. In this case, destinations (memory C 104) of the command A1 and command BY conflict with each other. The schedule unit 110 prioritizes the group A which has commands more than the group B has, issuing firstly the command A1. Thereby the command A1 is executed by the DMAC 101a. The command B1, a top command of the group B, is not able to be executed during DMA data transfer of the command A1, so that the execution of the command BY has to be wait until completion of the data transfer of the command A1. After completion of the data transfer of the command A1, the schedule unit 110 issues the command A2 to the DMAC 101a, and the command B1 to the DMAC 101b at the same time. This is because sources (memory D 105 and memory B 103) of the command A2 and the command B1 do not conflict with each other, and their destinations (memory A 102 and memory C 104) do not conflict with each other. After that, the schedule unit 110 issues both of the command A3 and the command B2 to be executed at the same time.

Figure 4B:
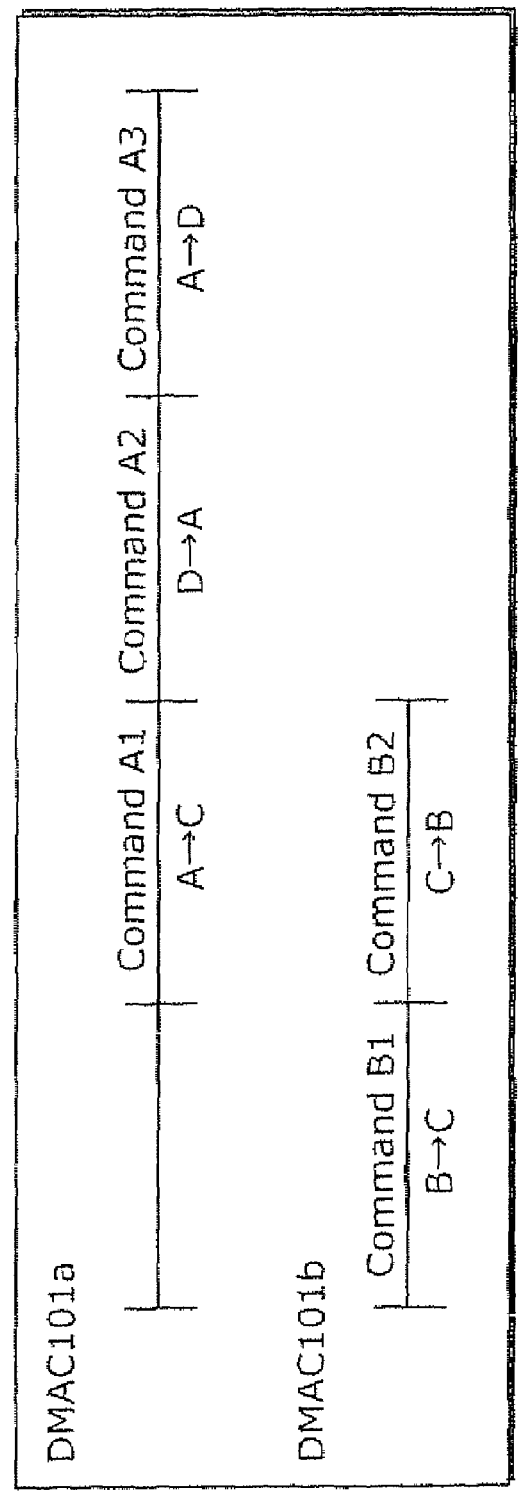
FIG. 4B is an explanatory diagram showing an example of command issuing, which is not preferable.

FIG. 4B is an explanatory diagram showing one example of command issuing which is not preferable. Supposing that the schedule unit 110 did not prioritize a group having more commands, a result would be as shown in FIG. 4B. Note that, here, data transfer sizes of all command are assumed to be equal, and a time required to transfer data having the size is assumed to be one cycle. FIG. 4A shows data transfers of the group A and the group B which complete in three cycles, while FIG. 4B shows the same data transfers which requires four cycles. Thus, by prioritizing a group having more commands, it is possible to shorten a total time required to transfer data of the entire groups, and to improve total use efficiency of the buses.

Figure 5:
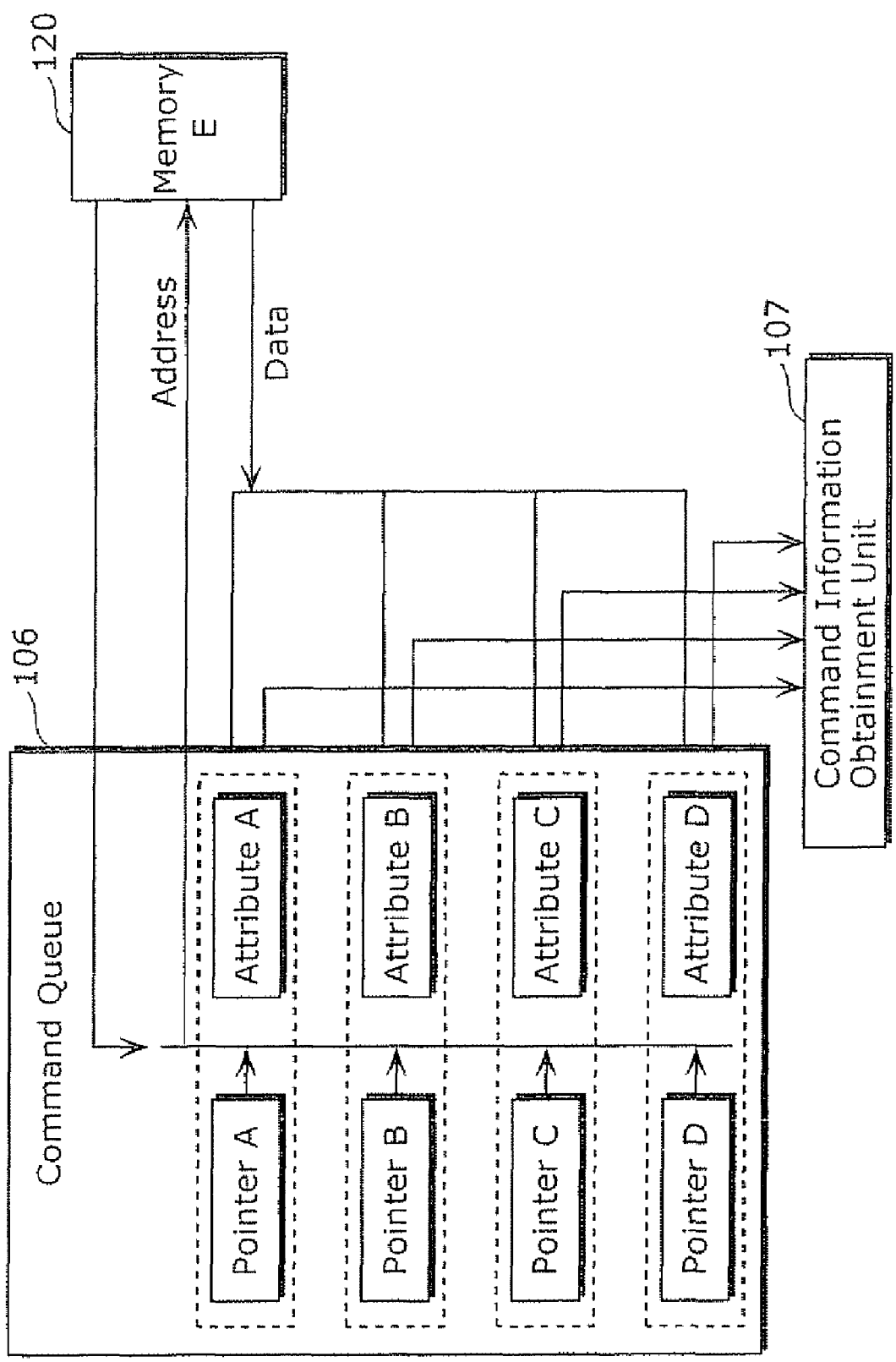
FIG. 5 is an explanatory diagram of a command queue and a command information obtainment unit.

FIG. 5 is an explanatory diagram of the command queue 106 and the command information obtainment unit 107. As shown in FIG. 5, one command includes a pointer and an attribute (above-described various parameters). A master of each bus writes the attribute into the memory E 120 as a DMA request, and also sets the pointer in the command queue 106. Note that the memory E 120 may exist on any one of the buses or anywhere, as far as each master can write the attributes into the memory E 120 directly or indirectly. The command information obtainment unit 107 reads out the attribute from the memory E120, according to the pointer set to the command queue 106, and has the command queue 106 hold the read-out attribute. The held attribute is read out from the command queue 106 by the command information obtainment unit 107, when needed.

Figure 6:
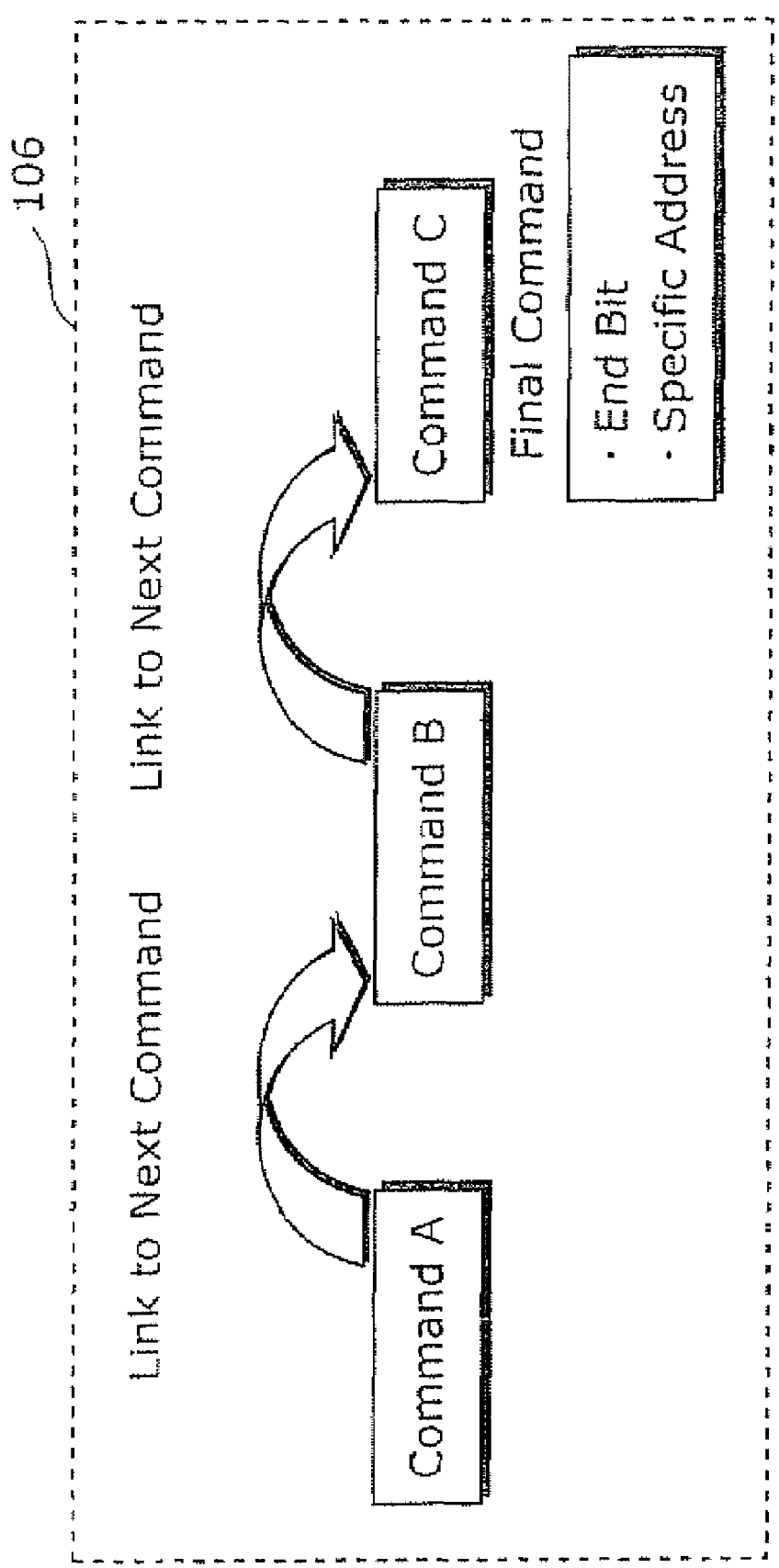
FIG. 6 is a diagram showing a command link in the command queue.

FIG. 6 is a diagram showing a command link held in the command queue 106. If a command length is fixed, a starting address of a next command is specified by adding a starting address of the current command with a fixed value. If a command length is variable, a starting address of a next command is determined by adding a starting address of the current command with a size indicated in link information which is included in the current command. Whichever the command length is, the command queue 106 holds the commands as a queue, since the commands are linked to one another. The command information obtainment unit 107 can obtain the attribute of any command by referring to the links of the commands As described above, the data transfer apparatus according to the first embodiment can improve total transfer efficiency of the entire three buses, when the DMAC 101a and the DMAC 101b independently executes respective DMA data transfers between the memories connected to the independent buses, the first to the third buses. More specifically, there is sometimes a conflict when the DMAC 101a and the DMAC 101b executes respective data transfers to the memory C 104 or the memory D 105, but, the schedule unit 110 prioritizes a group having more commands, so that it is possible to shorten a total DMA transfer time for all commands and also to improve total use efficiency of the buses, when there is the conflict of the DMA data transfers for the commands to be issued.

Note that, when a source of the transfer path is previously fixed, the grouping unit 108 may group the commands based on destinations of the transfer paths. Thereby, the command information obtainment unit 107 can obtain a parameter indicating the destination for the grouping, so that efficiency of the grouping can be improved.

Note also that, when a destination of the transfer path is previously fixed, the grouping unit 108 may group the commands based on sources of the transfer paths. Thereby, the command information obtainment unit 107 can obtain a parameter indicating the source for the grouping, so that efficiency of the grouping can be improved.

Second Embodiment

Figure 7:
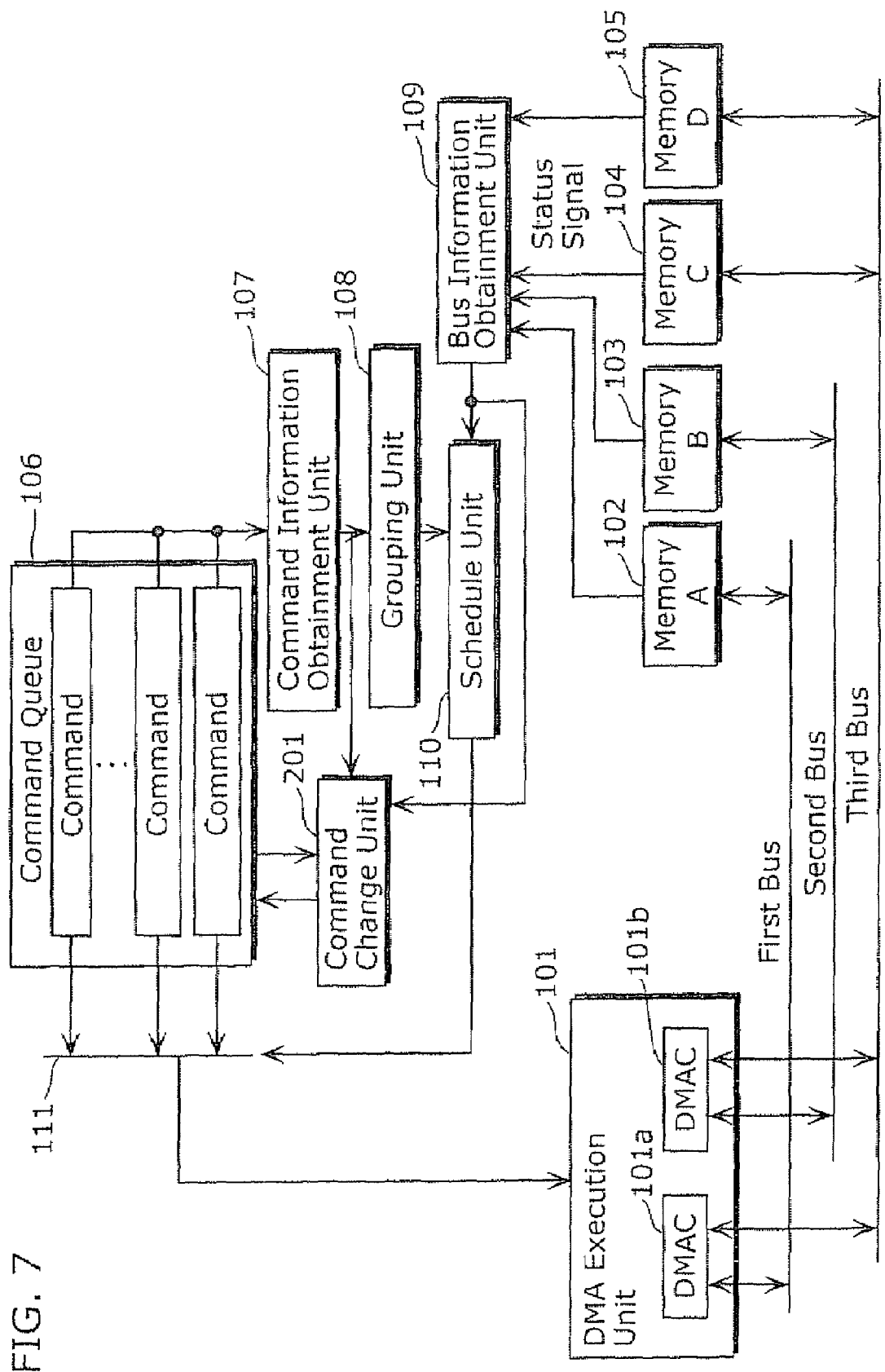
FIG. 7 is a block diagram showing a structure of a DMA data transfer apparatus according to the second embodiment of the present invention.

FIG. 7 is a block diagram showing a structure of a DMA data transfer apparatus according to the second embodiment of the present invention. This DMA data transfer apparatus is embedded in a device for processing a frame that indicates an image and includes a plurality of rectangular areas which are actually processed. This data transfer apparatus differs from the data transfer apparatus shown in FIG. 1 in that a command change unit 201 is added. The same elements are designated by the same reference numerals of FIG. 1 and the same elements are not described again but different elements are mainly described below.

The command change unit 201 analyzes: attributes of the commands obtained by the command information obtainment unit 107; and the bus information obtained by the bus information obtainment unit 109, in order to specify a command to be issued, whose data is to be divided for more efficient transfer, and divides the specified command held in the command queue 106 into two or more commands.

Figure 8:
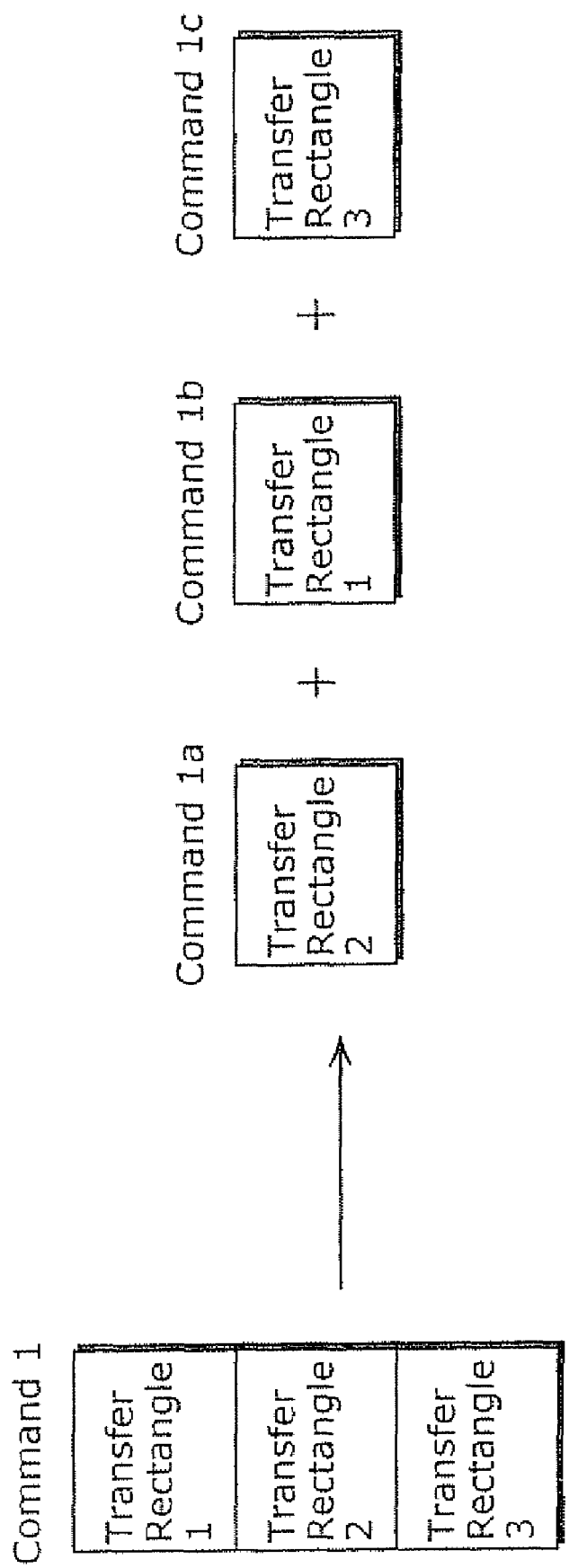
FIG. 8 is a diagram showing an example of command change performed by a command change unit.

FIG. 8 is a diagram showing one example of the command change performed by the command change unit 201. In FIG. 8, a command 1 is a top command in the command queue 106, and instructs transfer data which is a rectangle region included in one image data. This region has three rectangular areas 1 to 3. Transfer paths of data in the respective rectangular area are different. When a transfer path for the rectangular area 2 is free, the command change unit 201 divides the command 1 into a command 1a, a command 1b, and a command 1c, which correspond to the rectangular areas 1 to 3, respectively, so that the command 1a corresponding to the rectangular area 2 is firstly issued. The command 1a is a command which instructs to transfer data of the rectangular area 2 and this command 1a is able to be issued immediately. The command 1b is a command which instructs to transfer data of the rectangular area 1 and this command 1b is not able to be issued immediately. The command 1c is a command which instructs to transfer data of the rectangular area 3 and this command 1c is not able to be issued immediately. The command change unit 201 replaces the command 1 in the command queue 106 with the three divided commands. Thereby, the divided commands are issued sequentially in an order firstly from a command whose transfer path is free and available. Thus, the free of the buses can be effectively used and a total transfer time of the entire groups can be shortened.

Figure 9:
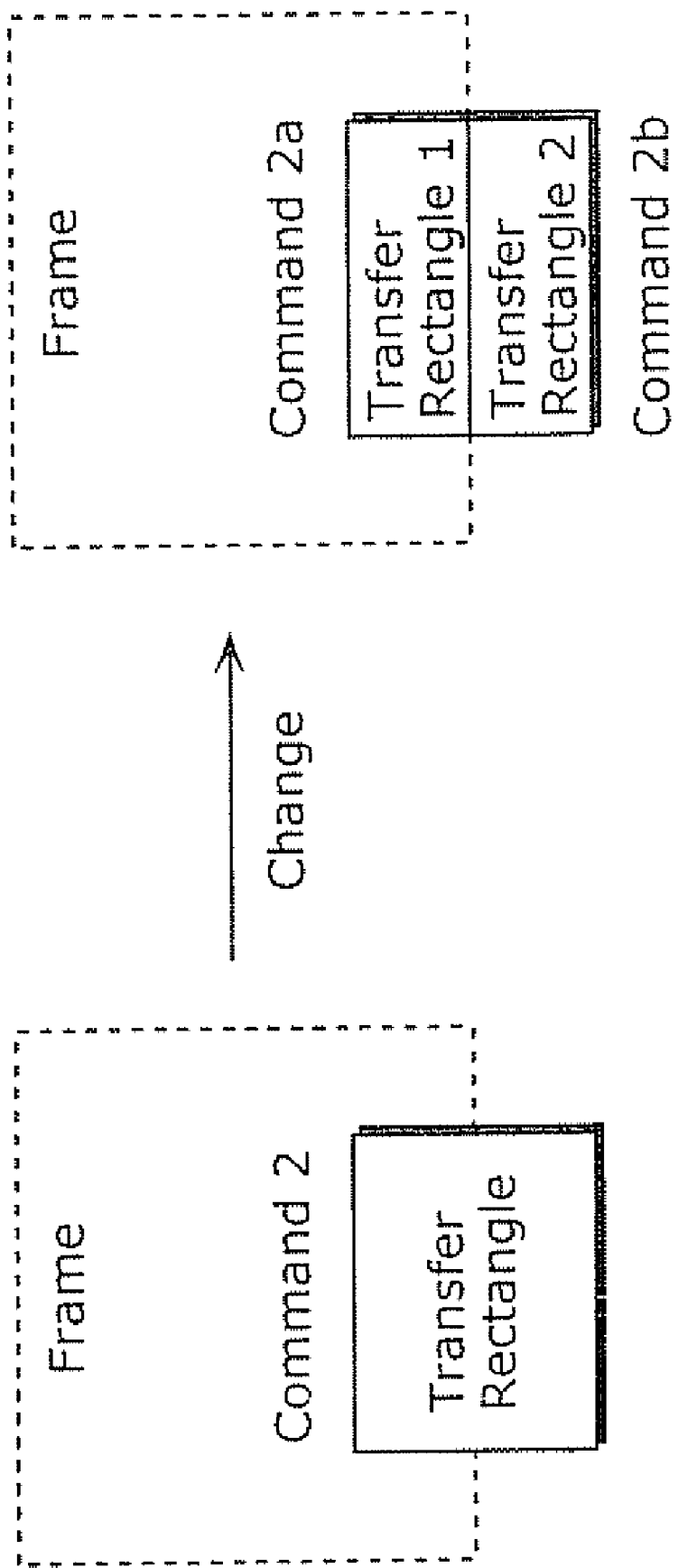
FIG. 9 is a diagram showing another example of the command change performed by the command change unit.

FIG. 9 is a diagram showing another example of the command change performed by the command change unit 201. In FIG. 9, a command 2 instructs to transfer data which is positioned in a rectangle region that is located across a boundary of a frame. This region includes data located inside the frame and data located outside the frame, so that the command change unit 201 divides the region into: a command 2a inside the frame, for instructing to transfer data of a rectangular area 1 in the frame; and a command 2b outside the frame, for instructing to transfer data of a rectangular area 2 in the frame. Here, the command 2a is a command which instructs to transfer valid data, which is image data, in the rectangular area 1 in the frame. Since the data of the rectangular area 1 outside the frame is invalid data, which is not image data, the command 2b instructs to write information indicating that the data is outside the frame boundary, into a destination memory, instead of transferring the unnecessary data. For example, the command 2b instructs to read out, from a source memory, the data of the rectangular area 2 outside the frame, by reading only pixels at the first line of the data, and to write the readout data repeatedly into the destination memory, instead of data at the second and following lines. By the eliminating of reading out the data at the second and the following lines in the rectangular area outside the frame, the invalid data located outside the frame is not further read out, so that it is possible to efficiently transfer only data located inside the frame, which results in improving the efficiency of the data transfer.

Figure 10:
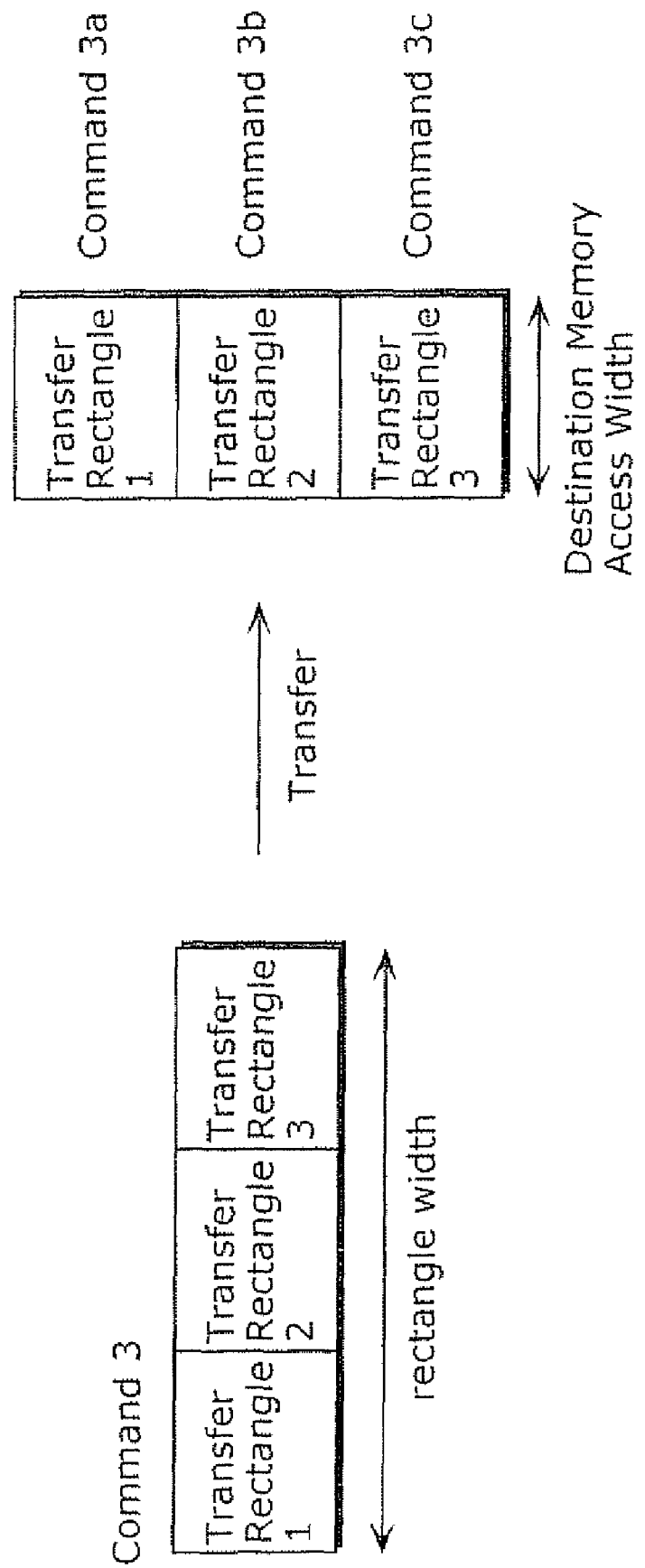
FIG. 10 is a diagram showing still another example of the command change performed by the command change unit.

FIG. 10 is a diagram showing still another example of the command change performed by the command change unit 201. In FIG. 10, a command 3 is command which instructs to transfer data which is located in a rectangular region having a certain width. The rectangular region includes three rectangular areas 1 to 3. When the width of the rectangular region is greater than a data width of a destination memory (three times of the data width, in FIG. 10), the command change unit 201 divides the command 3 into three commands 3a, 3b, and 3c corresponding to the rectangular areas 1 to 3, respectively, each of which has the same width of the data width. The commands 3a to 3c correspond to the divided rectangular areas 1 to 3. Thereby it is possible to reduce a whole overhead of data transfers of commands including the commands 3a to 3b and other commands, thereby improving data transfer efficiency. This is because there is discontinuity data transfers of the commands 3a to 3b, during which the other commands are able to be executed.

Third Embodiment

Figure 11:
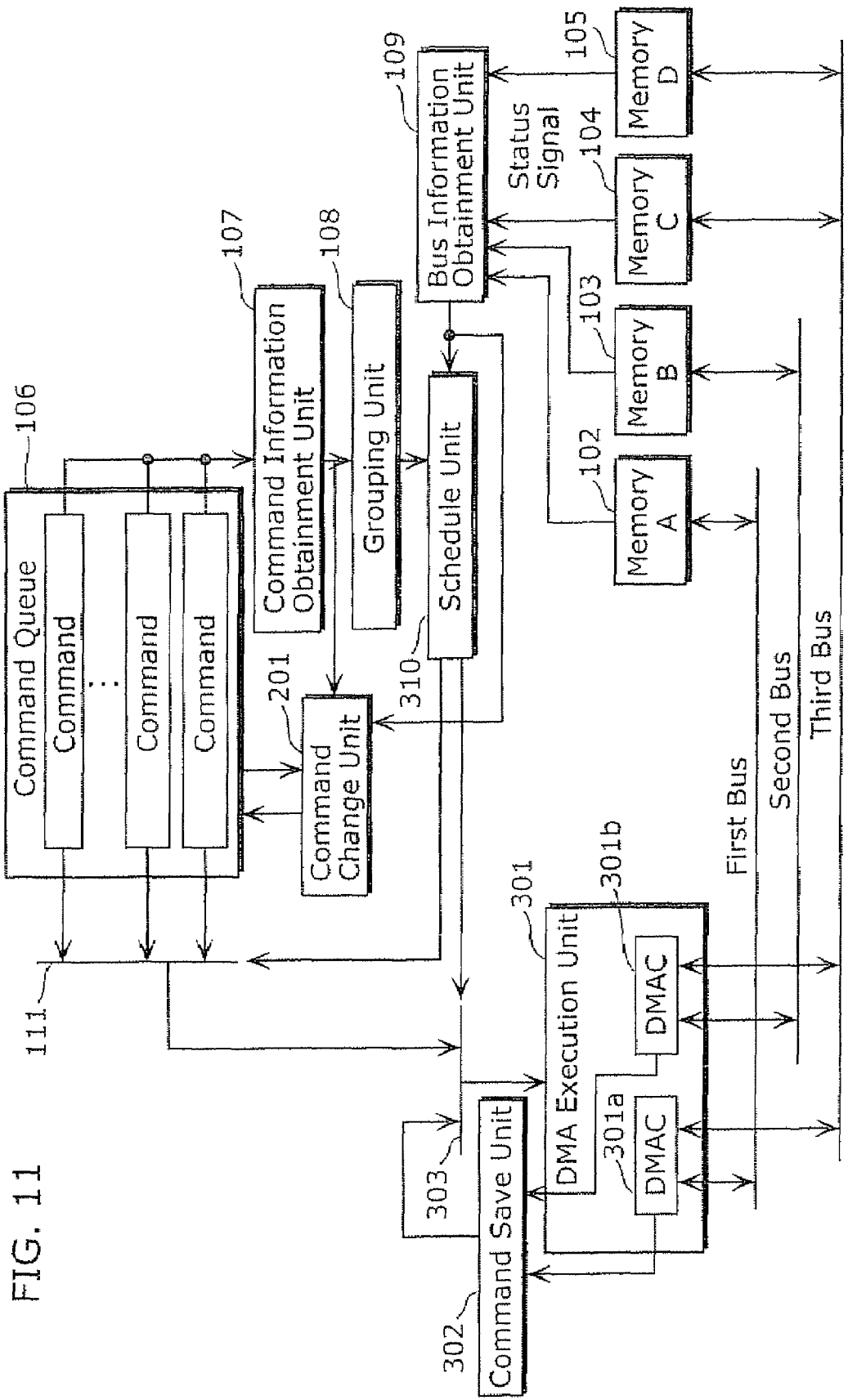
FIG. 11 is a block diagram showing a structure of a DMA data transfer apparatus according to the third embodiment of the present invention.

FIG. 11 is a block diagram showing a structure of a DMA data transfer apparatus according to the third embodiment of the present invention. This DMA data transfer apparatus differs from the DMA data transfer apparatus shown in FIG. 7 in that a DMA execution unit 301 is replaced with the DMA execution unit 101 of FIG. 7, a schedule unit 310 is replaced with the schedule unit 110 of FIG. 7, and a command save unit 302 and a selector 303 are added. The same elements are designated by the same reference numerals of FIG. 7, and the same elements are not described again but different elements are mainly described below.

The DMA execution unit 301 includes a DMAC 301a and a DMAC 301b. The DMAC 301a has a function of outputting a command which instructs to transfer remaining data, to the command save unit 302 during current DMA data transfer, as well as the same functions of the DMAC 101a of FIG. 7. The DMAC 301b also has the same functions described for the DMAC 301a.

The command save unit 302 temporarily holds a command which is outputted from the DMAC 301a or the DMAC 301b.

The schedule unit 310 compares a current command executed by the DMAC 301a or the DMAC 301b, with a command held in the command queue 106, in order to judge whether or not the current command is to be saved, in other words, to be temporarily held in the command save unit 302. In addition, the schedule unit 310 judges whether or not the saved command is to be returned.

More specifically, the schedule unit 310 judges whether or not the current command is to be saved, by comparing a transfer size of remaining data of the command which is currently being executed by the DMAC 301a or the DMAC 301b, with transfer sizes of data of top commands in respective groups held in the command queue 106. When the transfer size of the remaining data of the current command is smaller than the transfer size of the top command which is to be executed next, the judgment is made that the remaining data of the current command is to be saved. Here, however, the schedule unit 310 judges that the remaining data of the current command is not to be saved, when the transfer size of the remaining data is greater than a threshold value. Thereby, the remaining data is saved only when the transfer size of the remaining data is less than the threshold value, so that it is possible to prevent an adverse effect, such as extending of a time period from command receiving until completion of DMA data transfer) when the current command returns to be executed.

To the selector 303, the command from the command queue 106 and the command from the command save unit 302 are inputted, then the selector 303 selects, based on the judgment regarding necessity of the saving and the execution by the schedule unit 310, one of these commands to be outputted to the DMA execution unit 301.

By the data transfer apparatus according to the third embodiment having the above structure, during executing the current command having, for example, a great execution latency (a time required to transfer data), remaining data of the currently executed command is saved temporarily, then it is possible to execute, prior to execution of the remaining data, a command by which execution latency becomes smaller compared to a command of the saved data, or a command which instructs transfer of data whose transfer size is smaller compared to the saved data.

Note that the schedule unit 310 may judges whether or not the current command is to be saved, based on a time by which the data transfer that is instructed by the current command and is currently being executed by the DMAC 301a or the DMAC 301b, should be complete, and a time required to complete the data transfer. In this case, the time by which the data transfer should complete may be included in the command as an attribute of the command.

Fourth Embodiment

Figure 12:
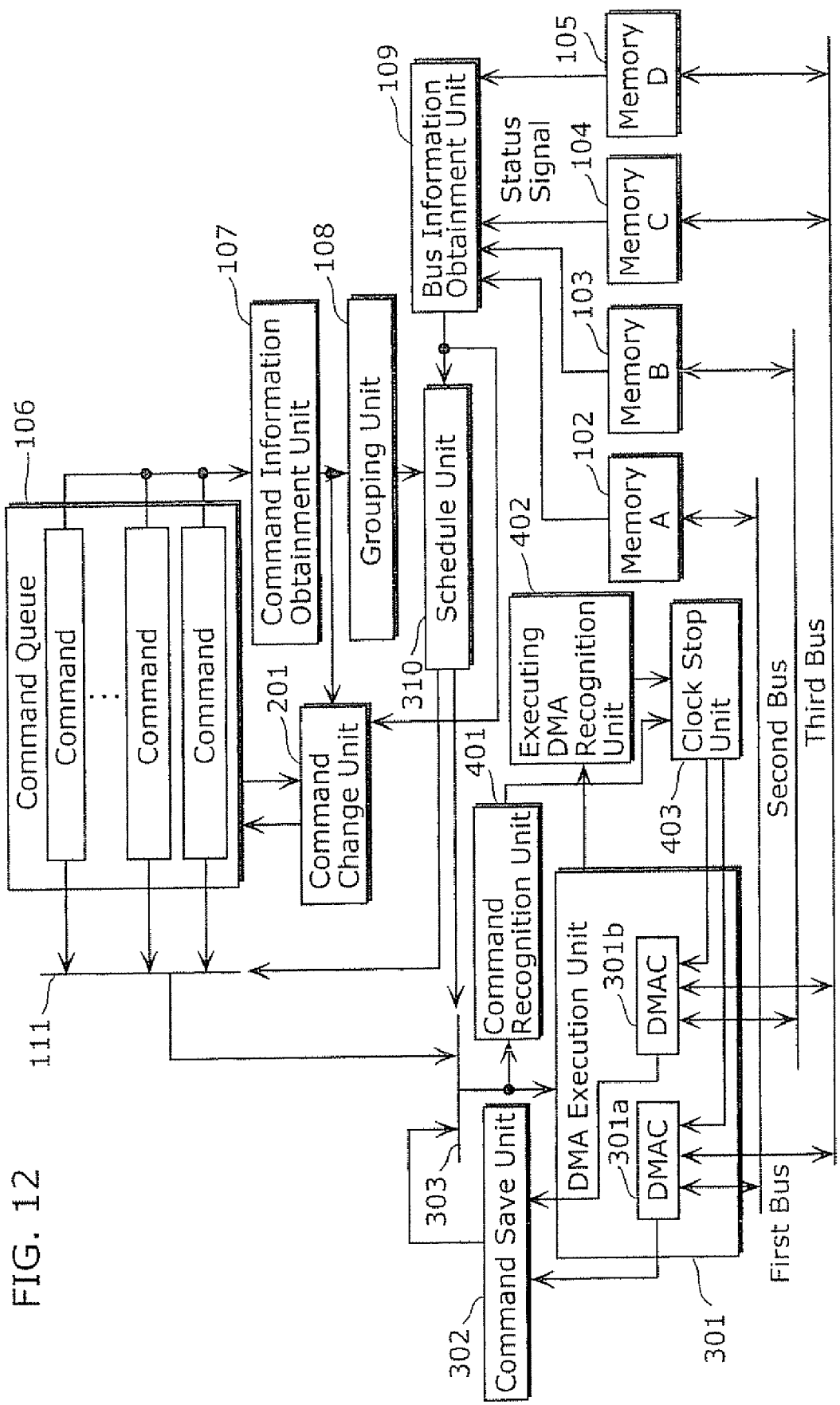
FIG. 12 is a block diagram showing a structure of a DMA data transfer apparatus according to the fourth embodiment of the present invention.

FIG. 12 is a block diagram showing a structure of a DMA data transfer apparatus according to the fourth embodiment of the present invention. This DMA data transfer apparatus differs from the DMA data transfer apparatus shown in FIG. 11 in that a command recognition unit 401, a DMA execution recognition unit 402, and a clock stop unit 403 are added. The same elements are designated by the same reference numerals of FIG. 11, and the same elements are not described again but different elements are mainly described below.

The command recognition unit 401 recognizes that a command is newly issued to each of the DMAC 301a and the DMAC 301b, from the selector 303.

The DMA execution recognition unit 402 recognizes that each of the DMAC 301a and the DMAC 301b has a command to be executed.

The clock stop unit 403 stops supplying a clock signal to the DMAC 301a when the DMAC 301a has no command to be executed, and the clock stop unit 403 starts again supplying the clock signal to the DMAC 301a when a new command is issued to the DMAC 301a during the stopping. Similarly, when the DMAC 301b has no command to be executed, the clock stop unit 403 stops supplying a clock signal to the DMAC 301b, and when a new command is issued to the DMAC 301b during the stopping, the clock stop unit 403 starts again supplying the clock signal to the DMAC 301b.

Thereby, it is possible to save electric power consumption of the data transfer apparatus, and especially when the data transfer apparatus is embedded in a portable telephone, a PDA, or the like, it is possible to extend a driving time of a battery.

Note that the above embodiments have described that a higher priority is given to a group having more commands by the schedule units 110 and 310, but it is also possible to use the following method. The method is that the higher priority is given as a next group, to another group that is not a next group in the order of priority, every time one group issues N (two or more) commands. By this method, in a case where respective total numbers of commands in the respective groups, which are registered in the command queue 106 by the masters, are significantly biased depending on the groups, it is possible to prevent from that a group having less commands is forced to be wait too long to issue the commands.

Although only some exemplary embodiments of the present invention have been described in detail above, those skilled in the art will be readily appreciate that many modifications are possible in so the exemplary embodiments without materially departing from the novel teachings and advantages of the present invention. Accordingly, all such modifications are intended to be included within the scope of the present invention.

INDUSTRIAL APPLICABILITY

The present invention is suitable as a data transfer apparatus which transfers data by direct memory access via a plurality of buses, for example, a data transfer apparatus used in an apparatus, such as a portable telephone, a DVD apparatus, a digital television set, which codes image to generate code sequence or decodes the code sequence.

What is claimed is:

1. A data transfer apparatus used in a system having a first data bus, a second data bus, and a third data bus, each of which is independent from one another, a first memory connected with the first data bus, a second memory connected with the second data bus, a third memory connected with the third data bus, and a fourth memory connected with the third data bus, said data transfer apparatus comprising:

a first transferor operable to transfer data by direct memory access between the first memory, and one of the third memory and the fourth memory;

a second transferor operable to transfer data by direct memory access between the second memory, and one of the third memory and the fourth memory;

a holder which holds, as a queue, commands for instructing data transfers;

an obtainer operable to obtain the commands held in said holder;

a grouper operable to group the held commands, based on a source or a destination indicated in each of the commands obtained by said obtainer, into a first group corresponding to said first transferor and a second group corresponding to said second transferor;

a scheduler operable to prioritize the first and second groups by giving a higher priority to one of the first and second groups to which more commands belong and to decide an order of issuing the commands sequentially from the one of the first and second groups having the higher priority; and an issuer operable to issue a command to one of said first transferor and said second transferor, according to the decided order, wherein said scheduler determines whether a conflict exists between a first command to be issued from the first group to said first transferor and a second command to be issued from the second group to said second transferor when the first command and the second command are to be executed by said first transferor and said second transferor in parallel, said issuer issues the first command in the first group to said first transferor and issues the second command in the second group to said second transferor when said scheduler determines that a conflict does not exist, and said scheduler prioritizes the groups so as to parallelize data-transfers by said first transferor and said second transferor when said scheduler determines that a conflict exists.

2. The data transfer apparatus according to claim 1, wherein said grouper is operable to group the commands by transfer-source memories.

3. The data transfer apparatus according to claim 2,
wherein said grouper is operable to group commands which designate the first memory as a transfer source into one of the first and second groups, and to group commands which designate the second memory as a transfer source into an other of the first and second groups.

4. The data transfer apparatus according to claim 1,
wherein said grouper is operable to group the commands by transfer-destination memories.

5. The data transfer apparatus according to claim 4,
wherein said grouper is operable to group commands which designate the first memory as a transfer destination into one of the first and second groups, and to group commands which designate the second memory as a transfer destination into an other of the first and second groups.

6. The data transfer apparatus according to claim 1,
wherein said grouper is operable to group commands which designate the first memory as a transfer source or a transfer destination into one of the first and second groups, and to group commands which designate the second memory as the transfer source or the transfer destination into an other of the first and second groups.

7. The data transfer apparatus according to claim 1,
wherein each of the commands includes a pointer and parameters, and said obtainer is operable to obtain the parameters according to the pointer, sequentially from a top command.

8. The data transfer apparatus according to claim 7,
wherein the commands have a fixed length, and said obtainer is operable to determine an address of a subsequent command, by sequentially adding each fixed length.

9. The data transfer apparatus according to claim 7,
wherein the command includes a link to a subsequent command, and said obtainer is operable to determine an address of the subsequent command according to the link.

10. The data transfer apparatus according to claim 7,
wherein the first memory is operable to receive a memory access command from a first master on the first data bus,
the second memory is operable to receive the memory access command from a second master on the second data bus, and
the third memory and the fourth memory are operable to receive the memory access command only from said first transferor and said second transferor.

11. The data transfer apparatus according to claim 10,
wherein the first memory has the higher priority, and
said grouper is operable to group the commands based on the higher priority.

12. The data transfer apparatus according to claim 7, further comprising:
a saver operable to temporarily save an executing command which is currently executed by one of said first transferor and said second transferor.

13. The data transfer apparatus according to claim 12,
wherein said scheduler is operable to determine whether the executing command is to be saved, by comparing the executing command which is currently executed by one of said first transferor and said second transferor, with the commands held in said holder.

14. The data transfer apparatus according to claim 7, further comprising:
a divider operable to divide one of the commands held in said holder into a plurality of the commands.

15. The data transfer apparatus according to claim 14, further comprising a processor which processes a frame representing a picture for a rectangular region in the frame,
wherein said divider is operable to divide one of the commands regarding the rectangular region into a first divided command for transferring data inside the frame, and a second divided command for transferring data outside the frame.

16. The data transfer apparatus according to claim 14,
wherein said divider is operable to divide the rectangular region in a transfer-source memory designated by the one of the commands, into a plurality of smaller regions, in order to divide the one of the commands into a plurality of the commands, each of which corresponds to each of the smaller regions.

17. The data transfer apparatus according to claim 7, further comprising:
a clock stopper operable to stop supplying a clock signal to one of said first transferor and said second transferor, when there is no command to be executed in one of said first transferor and said second transferor.

18. A data transfer method of transferring data, the method being used in a system having a first data bus, a second data bus, and a third data bus, each of which is independent from one another, a first memory connected with the first data bus, a second memory connected with the second data bus, a third memory connected with the third data bus, a fourth memory connected with the third data bus, a first transferor that transfers data by direct memory access between the first memory and one of the third memory and the fourth memory, a second transferor that transfers data by direct memory access between the second memory and one of the third memory and the fourth memory, and a holder which holds, as a queue, commands for instructing the data transfer, the data transfer method comprising:
obtaining the commands held in the holder;
grouping the commands into a first group corresponding to the first transferor and a second group corresponding to the second transferor based on a source or a destination indicated in each of the commands obtained in the obtaining;
scheduling, by prioritizing the first and second groups to give a higher priority to one of the first and second groups to which more commands belong and deciding an order of issuing the commands sequentially from the one of the first and second groups having the higher priority;
determining whether a conflict exists between a first command to be issued from the first group to the first transferor and a second command to be issued from the second group to the second transferor, when the first command and the second command are to be executed by the first transferor and the second transferor in parallel;
issuing the first command to be issued from the first group to the first transferor and the second command to be issued from the second group to the second transferor when it is determined that a conflict does not exist in the determining whether a conflict exists; and
prioritizing the groups so as to parallelize data-transfers by the first transferor and the second transferor when it is determined that a conflict exists in the determining whether a conflict exists.

19. A computer-readable storage medium on which a program is recorded, which causes a computer to transfer data, said program being used in a system having a first data bus, a second data bus, and a third data bus, each of which is independent from one another, a first memory connected with the first data bus, a second memory connected with the second data bus, a third memory connected with the third data bus, a fourth memory connected with the third data bus, a first transferor that transfers data by direct memory access between the first memory and one of the third memory and the fourth memory, a second transferor that transfers data by direct memory access between the second memory and one of the third memory and the fourth memory, and a holder which holds, as a queue, commands for instructing the data transfer, said program causing said computer to execute:

obtaining the commands held in the holder;

grouping the commands into a first group corresponding to the first transferor and a second group corresponding to the second transferor based on a source or a destination indicated in each of the commands obtained in the obtaining;

scheduling, by prioritizing the first and second groups to give a higher priority to one of the first and second groups to which more commands belong and deciding an order of issuing the commands sequentially from the one of the first and second groups having the higher priority;

determining whether a conflict exists between a first command to be issued from the first group to the first transferor and a second command to be issued from the second group to the second transferor, when the first command and the second command are to be executed by the first transferor and the second transferor in parallel;

issuing the first command to be issued from the first group to the first transferor and the second command to be issued from the second group to the second transferor when it is determined that a conflict does not exist in the determining whether a conflict exists; and prioritizing the groups so as to parallelize data-transfers by the first transferor and the second transferor when it is determined that a conflict exists in the determining whether a conflict exists.

* * * * *